United States Patent [19]
Dat

[11] Patent Number: 5,831,818
[45] Date of Patent: Nov. 3, 1998

[54] PORTABLE COMPUTER WITH REDUCED WEIGHT CASE WITH PROTRUDING AND RECESSED PORTIONS

[75] Inventor: Rovindra Dat, Dallas, Tex.

[73] Assignee: Texas Instruments Incorporated, Dallas, Tex.

[21] Appl. No.: 780,076

[22] Filed: Dec. 23, 1996

[51] Int. Cl.$^6$ .................................. G06F 1/16; H05K 5/02
[52] U.S. Cl. ........................................ 361/683; 312/223.2
[58] Field of Search ........................ 312/223.2; 220/4.02; 364/708.1; 361/683

[56] References Cited

U.S. PATENT DOCUMENTS

| | | | |
|---|---|---|---|
| 4,759,466 | 7/1988 | Chase et al. | 220/4.02 |
| 5,333,098 | 7/1994 | DeLuca et al. | 361/685 |
| 5,400,214 | 3/1995 | Antonuccio et al. | 361/683 |

*Primary Examiner*—Michael W. Phillips
*Attorney, Agent, or Firm*—Ronald O. Neerings; Richard L. Donaldson

[57] ABSTRACT

A portable computer (5) having a lightweight case are disclosed. The case includes a top panel (10) and a bottom panel (8), each with side panels (14*t*; 14*b*) integrally molded therewith or otherwise attached thereto. The top panel (10) and bottom panel (8) each are molded to have an inner surface portion (30; 28) having a checkerboard pattern of protrusions (20) and recessed portions (22). The side panels (14*t*; 14*b*) are of the full thickness of the protrusions (20), to provide structural support for the computer (5). Other panels (12; 18) may be similarly constructed to have checkerboard patterns of protrusions (20) and recessed portions (22), as desired.

15 Claims, 3 Drawing Sheets

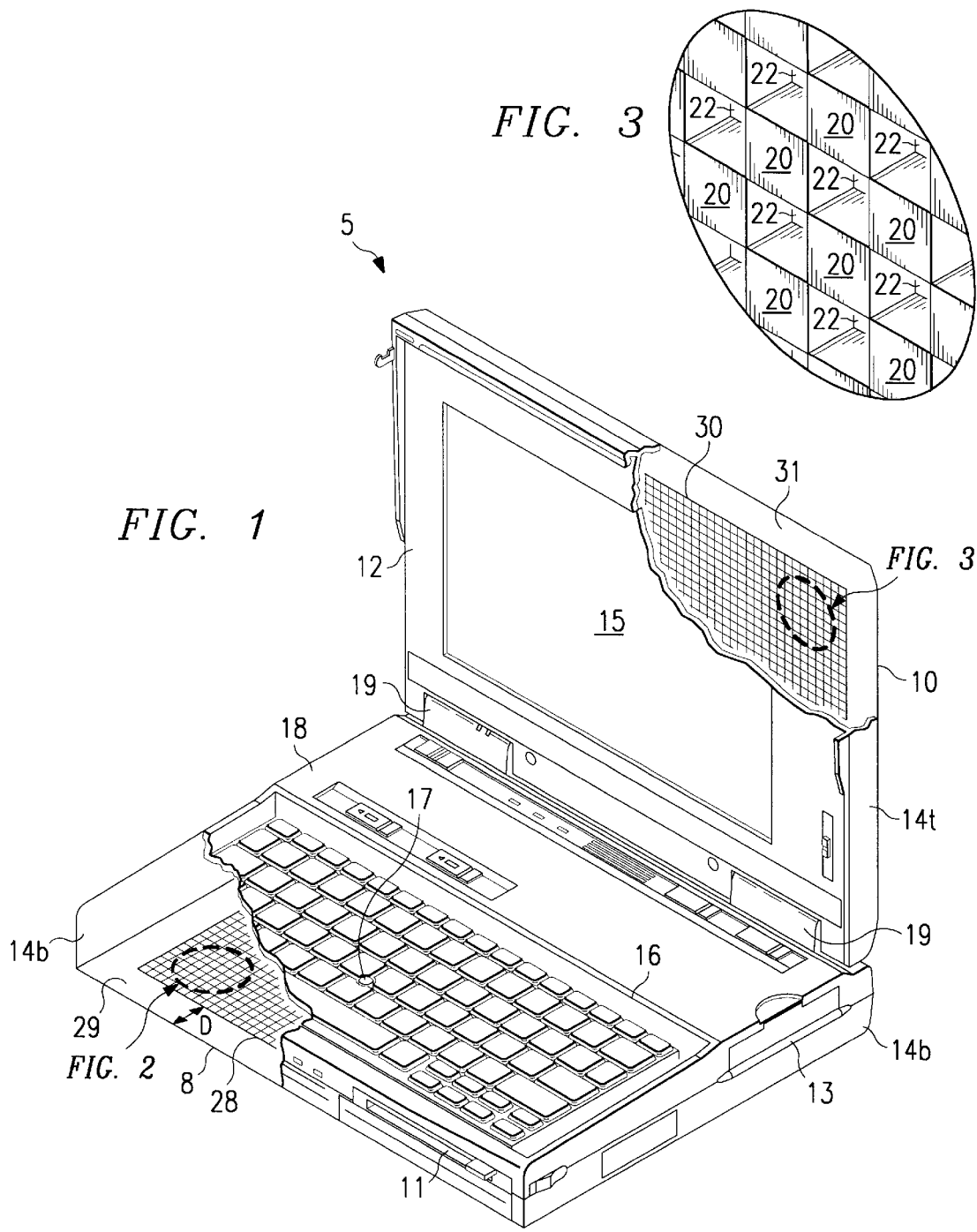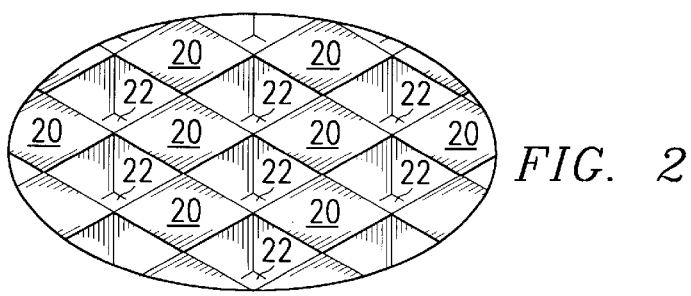

PORTABLE COMPUTER WITH REDUCED WEIGHT CASE WITH PROTRUDING AND RECESSED PORTIONS

BACKGROUND OF THE INVENTION

This invention is in the field of portable computers, and is more specifically directed to case construction therefor.

Significant advances have been made in recent years in the field of personal computers, particularly in their miniaturization and portability. Because of such advances, portable computers of the so-called "notebook" class are now widely available, having high degrees of functionality and computational performance, mass data storage of on the order of gigabytes, and weighing less than five pounds.

Of course, further miniaturization of portable computer systems continues to be desirable so that higher levels of performance can become available in yet smaller and lighter packages, enabling wider use of data processing systems over a wider range of applications. In particular, reduction of the overall standing weight of the portable computer is desirable not only from the standpoint of comfort for the user in transporting the portable computer, but also to enable more widespread use of portable computers. The importance of reducing system weight is quite evident from the increased market acceptance and economic success of lightweight portable computers, as system weight is often a strong factor in consumer selection of portable computers. Furthermore, it is also beneficial to reduce the weight of passive components, such as those providing structural and environmental protection for the computer, to allow the implementation of additional functionality (e.g., CD-ROM drives, modems, and the like) while still maintaining a reasonable overall system weight.

It has been observed, in connection with the present invention, that the outer shell, or case, of a portable computer contributes significantly to the overall weight of the system. Conventional portable computer cases are typically formed of high impact plastic, such as a polycarbonate-acrylonitrile butadiene styrene copolymer (PC-ABS), of a uniform thickness selected to provide the desired level of structural integrity. For example, cases formed of PC-ABS blends typically have a uniform thickness of on the order of 100 mils to provide the desired structural strength.

By way of further background, other internal cases are also included within a portable computer. For example, disk drives and batteries typically also have cases of plastic or other material, to provide environmental protection for the internal construction of the disk drive and battery. These internal cases also contribute to the overall weight of the portable computer.

BRIEF SUMMARY OF THE INVENTION

It is an object of the present invention to provide a molded external case for a portable computer having a reduced weight.

It is a further object of the present invention to provide such a case in which the case is formed of conventional case material.

It is a further object of the present invention to provide such a case in which the structural strength of the case is substantially similar to that of conventional cases.

It is a further object of the present invention to provide reduced weight cases for internal components of portable computers.

Other objects and advantages of the present invention will be apparent to those of ordinary skill in the art having reference to the following specification together with its drawings.

The present invention may be implemented into a portable computer case in which the inner surface of large planar surfaces, such as the top and bottom of the case, included molded checkerboard portions of protrusions and recessed portions. The protrusions of the checkerboard portions are preferably at the full thickness to provide strength. Similar construction may be provided for internal panels of the computer, as well as for the cases of internal system elements such as disk drives and battery cases. Edge portions of the portable computer case are left at full thickness, to ensure full structural strength of the case.

BRIEF DESCRIPTION OF THE SEVERAL VIEWS OF THE DRAWING

FIG. 1 is a perspective cutaway view of a portable computer constructed according to the preferred embodiment of the invention, as open.

FIG. 2 is an enlarged perspective view of a portion of the inner surface of the bottom panel of case of the computer of FIG. 1 according to the preferred embodiment of the invention.

FIG. 3 is an enlarged perspective view of a portion of the inner surface of the bottom panel of case of the computer of FIG. 1 according to the preferred embodiment of the invention.

DETAILED DESCRIPTION OF THE INVENTION

Figure 4:
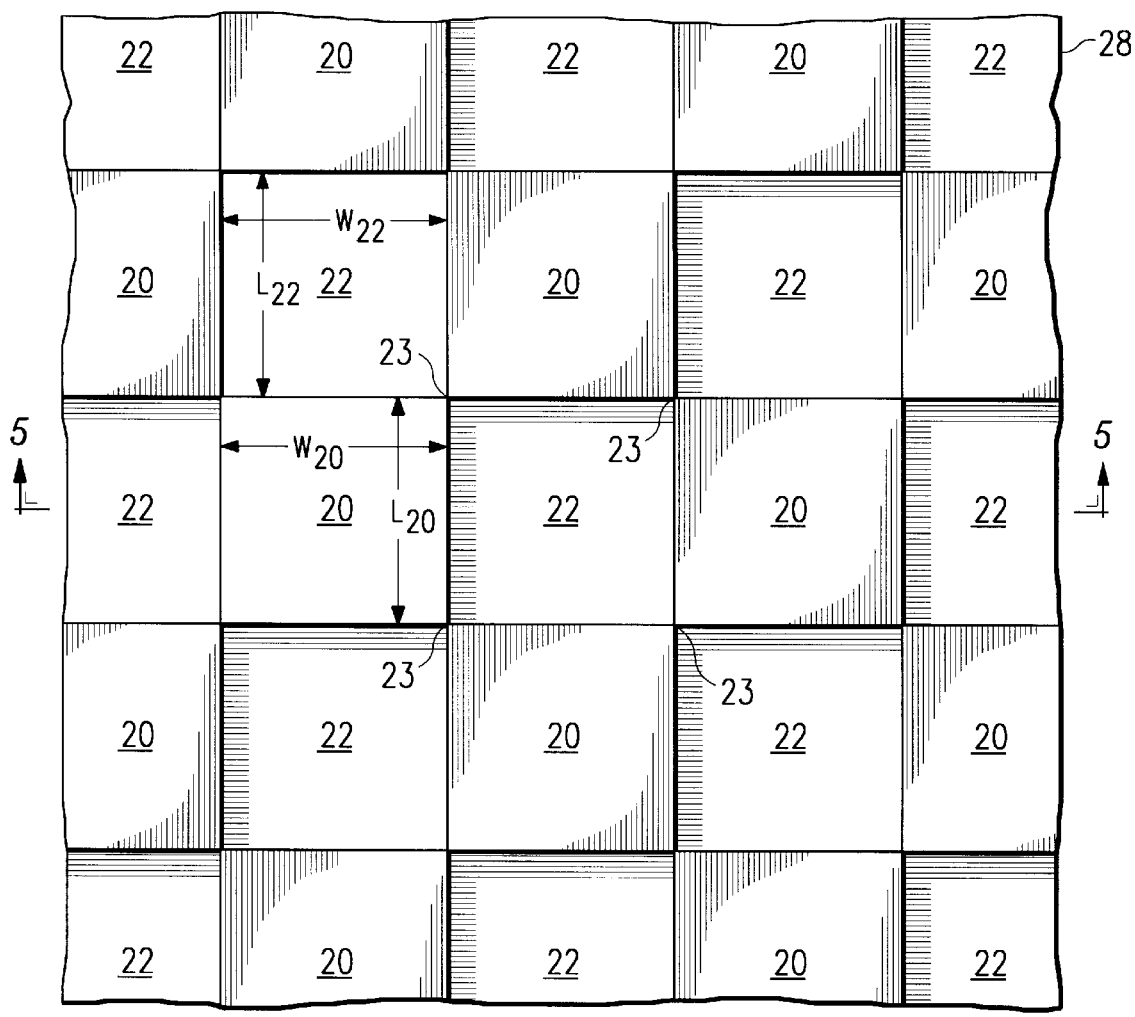
FIG. 4 is a plan view of a portion of the inner surface of the case of the computer of FIG. 1 according to the preferred embodiment of the invention.

Referring first to FIG. 1, computer 5 according to the preferred embodiment of the invention will now be described in detail. Computer 5 is a portable personal computer of a level of performance and functionality commensurate with the state of the art, such as the TRAVELMATE 6050 notebook computer available from Texas Instruments Incorporated. For example, computer 5 may utilize a high performance (on the order of 150 MHz or faster clock speed) x86 architecture microprocessor, and include a hard disk drive with over 1 gigabyte capacity, CD-ROM drive, active matrix color display, various expansion card slots, and the like.

As illustrated in FIG. 1, computer 5 is housed by a case constructed according to the preferred embodiment of the invention. Case bottom panel 8 has sides 14b molded integrally therewith or attached thereto, as the case may be. Bottom panel 8 and sides 14b house most of the functional components of computer 5, including keyboard 16, pointing device 17 (which, in this example, is a stick pointer; alternatively, a touchpad or trackball may be used), floppy disk drive 11, expansion port 13, and internal functional components (not shown) such as the mother board, hard disk drive, battery, and other typical system elements. When computer 5 is open, as shown in FIG. 1, keyboard 16 and keyboard panel 18 serve to enclose the contents housed by bottom panel 8 and sides 14b.

Case top panel 10 has sides 14t molded integrally therewith or attached thereto, as the case may be. Top panel 10 is attached to bottom panel 8 by way of hinges 19 along one side of each, so that computer 5 may be opened and closed in the conventional manner. Top panel 10 and sides 14t house graphics display 15, along with other output components as applicable, including the drive electronics for display 15 (not shown) and optional components such as speakers. When computer 5 is open, as shown in FIG. 1, display 15 and display panel 12 serve to enclose the contents housed by top panel 10 and sides 14t.

Bottom panel 8, top panel 10, and their respective sides 14b, 14t, are preferably formed of molded high impact plastic, such as conventionally used in portable computer cases. For example, a material typically used in the fabrication of portable computer cases and thus suitable for use as bottom panel 8, top panel 10, and sides 14b, 14t of computer 5, is a polycarbonate-acrylonitrile butadiene styrene copolymer (PC-ABS) blend, fabricated into the desired shape by injection molding in the conventional manner. Sides 14b, 14t may be molded integrally with bottom panel 8 and top panel 10, respectively, if desired, or alternatively may be molded separately and subsequently bonded thereto by way of conventional epoxy or other adhesives.

According to the preferred embodiment of the invention, case bottom panel 8 and case top panel 10 each have portions 28, 30, respectively, of their inner surfaces constructed according to a checkerboard pattern of protrusions 20 and recessed portions 22, as shown by the enlarged views of FIG. 2 (for bottom panel 8) and FIG. 3 (for bottom panel 10). As evident from FIG. 1, bottom panel 8 and top panel 10 each involve substantial planar surfaces, and thus contribute significantly to the weight of computer 5. According to the preferred embodiment of the invention, this weight is reduced by the construction of portions 28, 30 with recessed portions 22 therewithin spaced among protrusions 20.

Figure 5:
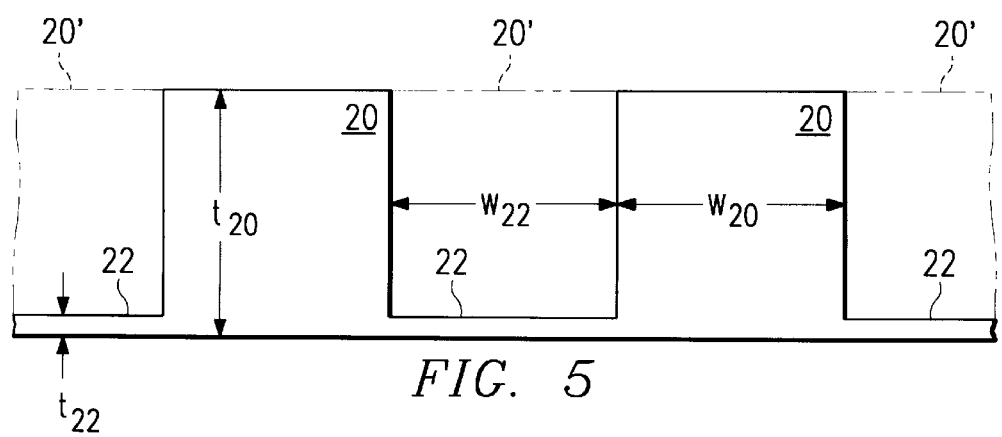
FIG. 5 is a cross-sectional elevation view of the portion of the case of FIG. 4.

Referring now to FIGS. 4 and 5, an example of the construction of checkerboard portion 28 of case bottom panel 8 will be described in detail. According to the preferred embodiment of the invention, portion 30 of top panel 10 is constructed similarly as portion 28 illustrated in FIGS. 4 and 5. As shown in the plan view of FIG. 4, protrusions 20 and recessed portions 22 are formed substantially as similarly sized squares, alternating with one another in a checkerboard arrangement, with corners of protrusions 20 in contact with one another at points 23. As illustrated in FIG. 4, each protrusion 20 has a length $l_{20}$ and width $w_{20}$, while each recessed portion 22 has a length $l_{22}$ and width $w_{22}$. The sizes of lengths $l_{20}$, $l_{22}$ and widths $w_{20}$, $w_{22}$ are relatively non-critical; for example, similarly-sized square protrusions 20 and recessed portions 22 as shown in FIGS. 4 and 5 according to the preferred embodiment of the invention may have lengths $l_{20}$, $l_{22}$ and widths $w_{20}$, $w_{22}$ that are each on the order of 100 mils.

If desired for additional strength, at a cost of slightly increased weight, protrusions 20 may be enlarged at corners 23 to provide additional material thereat. In addition, protrusions 20 and recessed portions 22 need not necessarily be formed into squares, but instead may be rectangular, diamond-shaped, trapezoidal, or of any other (preferably regular) desired shape. As portions 28, 30 are within the inner surfaces of bottom panel 8 and top panel 10, respectively, it is contemplated that the shapes of protrusions 20 and recessed portions 22 will be selected primarily for ease of molding rather than for ornamental effect.

The cross-sectional view of FIG. 5 illustrates the relative thicknesses of protrusions 20 relative to recessed portions 22; protrusions 20 in the next row from that of the cross-section of FIG. 5, behind recessed portions 22, are illustrated as protrusions 20' in FIG. 5. According to this preferred embodiment of the invention, protrusions 20 have a thickness $t_{20}$ that is substantially thicker than thickness $t_{22}$ of recessed portions 22. The thickness $t_{20}$ of protrusions 20 is preferably selected according to the desired strength of the case of computer 5. For example, thickness $t_{20}$ may be on the order of 100 mils, which corresponds to the uniform thickness of conventional computer cases as selected for purposes of structural strength, while thickness $t_{22}$ may be on the order of 10 mils, or 10% of the thickness $t_{20}$ of protrusions 20.

According to the preferred embodiment of the invention, it is contemplated that significant weight reduction is obtained in portions 28, 30. In the above-noted example, where thickness $t_{20}$ is 100 mils and thickness $t_{22}$ is 10 mils, a weight reduction of approximately 45% is obtained for checkerboard portions 28, 30 of bottom panel 8 and top panel 10, respectively. Considering the relatively large planar area of bottom panel 8 and top panel 10 in the case of computer 5, such weight reduction will significantly reduce the overall weight of computer 5.

Referring back to FIG. 1, structural strength of the overall case of computer 5 is maintained according to the preferred embodiment of the invention by limiting checkerboard portions 28, 30 to the interior of bottom panel 8 and top panel 10, respectively. Accordingly, as shown in FIG. 1, bottom panel 8 has border portion 29 of full thickness (i.e., thickness $t_{20}$ of protrusions 20) extending a distance d from the edge of bottom panel 8. Similarly, top panel 10 has border portion 31 of full thickness that also extends a distance d from the edge of top panel 10. Distance d may be on the order of 500 mils from the edge of top 8 and bottom 10, according to this embodiment of the invention.

Also according to the preferred embodiment of the invention, vertical surfaces, namely sides 14t, 14b, are not constructed so as to have checkerboard portions similar to portions 28, 30 described hereinabove. Instead, it is preferred that sides 14t, 14b be of full thickness (e.g., thickness $t_{20}$ of protrusions 20). This construction maintains the structural strength of the case of computer 5 according to the preferred embodiment of the invention, particularly relative to twisting forces exerted thereupon.

Additional weight reduction may also be obtained by constructing other portions of computer 5 to include checkerboard portions similar to portions 28, 30 described hereinabove in their inner, unexposed, surfaces. For example, keyboard panel 18 located near keyboard 16 may be constructed to have a checkerboard portion in its inner surface, as may display panel 12 surrounding display 15. In addition, similar construction may be applied to internal components of computer 5, such as in cases for batteries and hard disk drives utilized therein. Of course, the overall weight reduction afforded by construction of these other elements will be a function of their size (i.e., the surface area constructed according to the checkerboard described hereinabove).

Figure 6:
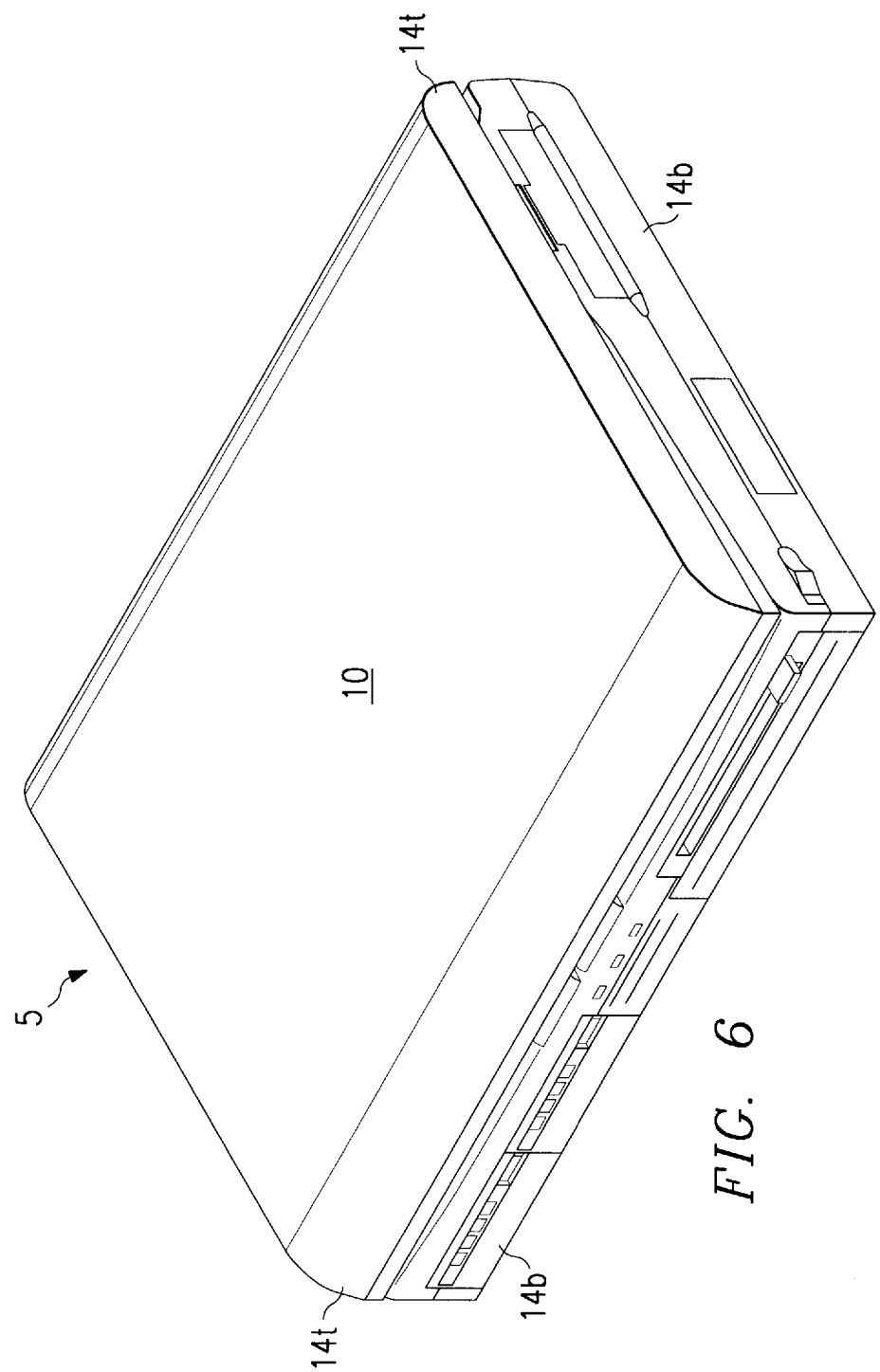
FIG. 6 is a perspective view of the portable computer of FIG. 1 according to the preferred embodiment of the invention, as closed.

Referring now to FIG. 6, computer 5 is illustrated in its closed state. As shown in FIG. 6, case top panel 10 has a substantially smooth surface, considering that its checkerboard portion 30 is at the inner surface of top panel 10, rather than at its outer surface. As noted above, case bottom panel 8 is similarly constructed, and as such the bottom surface of computer 5 will also be substantially smooth. Of course, surface finishing may be applied to the exposed outer surfaces of bottom panel 8 and top panel 10, for example to provide a matte finish or other finish suitable for the desired appearance and texture of computer 5. Sides 14t, 14b, as described hereinabove, are of full thickness, to provide structural strength for computer 5.

While the present invention has been described according to its preferred embodiment, it is of course contemplated that modifications of, and alternatives to, this embodiment, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A portable computer, comprising:

a lower case, comprising a bottom panel and a plurality of bottom side panels;

an upper case, comprising a top panel and a plurality of top side panels;

a graphics display, housed within the upper case;

a keyboard, housed within the lower case;

wherein the lower case is pivotally attached to the upper case at edges thereof so that the computer may be opened and closed, such that the keyboard and graphics display are contained within the closed computer;

wherein each of the top panel and bottom panel have an inner surface, a portion of which has a plurality of protrusions of a first thickness, each protrusion connected to at least one adjacent protrusion, and has a plurality of recessed portions of a second thickness less than the first thickness disposed among the protrusions; and wherein each of the pluralities of bottom side panels and top side panels are of the first thickness.

2. The computer of claim 1, wherein the protrusions are arranged in a checkerboard pattern, so that each protrusion is connected to at least one adjacent protrusion at corners thereof.

3. The computer of claim 1, further comprising:

a keyboard panel, housed within the bottom case adjacent to the keyboard, and having an inner surface, a portion of which has a plurality of protrusions of the first thickness, each protrusion connected to at least one adjacent protrusion, and has a plurality of recessed portions of the second thickness disposed among the protrusions.

4. The computer of claim 1, further comprising:

a display panel, housed within the top case adjacent to the graphics display, and having an inner surface, a portion of which has a plurality of protrusions of the first thickness, each protrusion connected at least one adjacent protrusion, and has a plurality of recessed portions of the second thickness disposed among the protrusions.

5. The computer of claim 1, wherein the bottom side panels and the bottom panel are integrally molded with one another;

and wherein the top side panels and the top panel are integrally molded with one another.

6. A portable computer, comprising:

a lower case, comprising a bottom panel and a plurality of bottom side panels;

an upper case, comprising a top panel and a plurality of top side panels;

a graphics display, housed within the upper case;

a keyboard, housed within the lower case;

wherein the lower case is pivotally attached to the upper case at edges thereof so that the computer may be opened and closed, such that the keyboard and graphics display are contained within the closed computer;

wherein each of the top panel and bottom panel have an inner surface, a portion of which has a plurality of protrusions of a first thickness, each protrusion connected to at least one adjacent protrusion, and has a plurality of recessed portions of a second thickness less than the first thickness disposed among the protrusions; and wherein each of the top and bottom panels also include boundary portions of the first thickness.

7. The computer of claim 6, wherein the protrusions are arranged in a checkerboard pattern, so that each protrusion is connected to at least one adjacent protrusion at corners thereof.

8. The computer of claim 6, further comprising:

a keyboard panel, housed within the bottom case adjacent to the keyboard, and having an inner surface, a portion of which has a plurality of protrusions of the first thickness, each protrusion connected to at least one adjacent protrusion, and has a plurality of recessed portions of the second thickness disposed among the protrusions.

9. The computer of claim 6, further comprising:

a display panel, housed within the top case adjacent to the graphics display, and having an inner surface, a portion of which has a plurality of protrusions of the first thickness, each protrusion connected at least one adjacent protrusion, and has a plurality of recessed portions of the second thickness disposed among the protrusions.

10. The computer of claim 6, wherein the bottom side panels and the bottom panel are integrally molded with one another;

and wherein the top side panels and the top panel are integrally molded with one another.

11. A portable computer, comprising:

a lower case, comprising a bottom panel and a plurality of bottom side panels;

an upper case, comprising a top panel and a plurality of top side panels;

a graphics display, housed within the upper case;

a keyboard, housed within the lower case;

wherein the lower case is pivotally attached to the upper case at edges thereof so that the computer may be opened and closed, such that the keyboard and graphics display are contained within the closed computer;

wherein each of the top panel and bottom panel have an inner surface, the inner surface having a boundary portion surrounding a plurality of protrusions of a first thickness within the boundary portion, each protrusion connected to at least one adjacent protrusion and having a plurality of recessed portions of a second thickness less than the first thickness disposed among the protrusions; and wherein the width of the boundary portion is greater than the width of a respective one of the plurality of protrusions.

12. The computer of claim 11, wherein the protrusions are arranged in a checkerboard pattern, so that each protrusion is connected to at least one adjacent protrusion at corners thereof.

13. The computer of claim 11, further comprising:

a keyboard panel, housed within the bottom case adjacent to the keyboard, and having an inner surface, a portion of which has a plurality of protrusions of the first thickness, each protrusion connected to at least one adjacent protrusion, and has a plurality of recessed portions of the second thickness disposed among the protrusions.

14. The computer of claim 11, further comprising:

a display panel, housed within the top case adjacent to the graphics display, and having an inner surface, a portion of which has a plurality of protrusions of the first thickness, each protrusion connected at least one adjacent protrusion, and has a plurality of recessed portions of the second thickness disposed among the protrusions.

15. The computer of claim 11, wherein the bottom side panels and the bottom panel are integrally molded with one another;

and wherein the top side panels and the top panel are integrally molded with one another.

* * * * *